US008188161B1

(12) United States Patent
Messana (10) Patent No.: US 8,188,161 B1
(45) Date of Patent: May 29, 2012

(54) ANAEROBIC CURE SYSTEMS FOR ANAEROBIC CURABLE COMPOSITIONS, AND ANAEROBIC CURABLE COMPOSITIONS CONTAINING SAME

(75) Inventor: Andrew D. Messana, Newington, CT (US)

(73) Assignee: Henkel Corporation, Rocky Hill, CA (US)

( * ) Notice: Subject to any disclaimer, the term of this patent is extended or adjusted under 35 U.S.C. 154(b) by 694 days.

(21) Appl. No.: 12/358,860

(22) Filed: Jan. 23, 2009

(51) Int. Cl.
*C09J 4/00* (2006.01)
*C08F 20/06* (2006.01)

(52) U.S. Cl. ........ 523/176; 524/252; 524/247; 524/257; 525/343; 525/374; 525/383; 526/317.1; 526/319; 526/320; 526/205; 526/204

(58) Field of Classification Search ................ 428/36.8; 525/232, 211, 343, 374, 383; 524/525, 252, 524/247, 257; 521/140; 523/176; 526/317.1, 526/319, 320, 205, 204
See application file for complete search history.

(56) References Cited

U.S. PATENT DOCUMENTS

| 3,218,305 | A | | 11/1965 | Krieble |
|---|---|---|---|---|
| 4,180,640 | A | * | 12/1979 | Melody et al. ............. 526/323.1 |
| 4,287,330 | A | | 9/1981 | Rich |
| 4,321,349 | A | | 3/1982 | Rich |
| 4,413,108 | A | | 11/1983 | Janssen |
| 4,500,608 | A | | 2/1985 | Rametta |
| 4,528,059 | A | | 7/1985 | Janssen |
| 4,656,229 | A | * | 4/1987 | Chiao ........................... 525/518 |
| 5,550,265 | A | | 8/1996 | Castellanos et al. |
| 5,668,192 | A | | 9/1997 | Castellanos et al. |
| 5,811,473 | A | | 9/1998 | Ramos et al. |
| 6,043,327 | A | | 3/2000 | Attarwala et al. |
| 6,147,184 | A | | 11/2000 | Castellanos et al. |
| 6,153,661 | A | | 11/2000 | Castellanos et al. |
| 6,835,762 | B1 | | 12/2004 | Klemarczyk et al. |
| 6,897,277 | B1 | | 5/2005 | Klemarczyk et al. |
| 6,958,368 | B1 | * | 10/2005 | Klemarczyk et al. ......... 523/176 |
| 2008/0251195 | A1 | * | 10/2008 | Malofsky et al. .......... 156/275.5 |

FOREIGN PATENT DOCUMENTS

WO  WO/98/46647  10/1998

OTHER PUBLICATIONS

R.D. Rich, "Anaerobic Adhesives" in *Handbooks of Adhesives Technology*, 29, 467-79, A. Pizzi and K.L. Mittal, eds., Marcel Dekker, Inc., New York (1994).
F.J. Boerio et al., "Surface-Enhanced Raman Scattering from Model Acrylic Adhesive Systems", Langmuir, 6, 721-27 (1990).
J.V. Crivello et al., Redox Cationic Polymerization: The Diaryliodonium Salt/Ascorbate Redox Couple, J.Polym. Sci., 19, 539-48 (1981).
G. V. Perez and Alice L. Perez, "Organic Acids Without a Carboxylic Acid Functional Group", J.Chem.Ed 77, 7, 910-15 (2000).

* cited by examiner

*Primary Examiner* — Michael M Bernshteyn
(74) *Attorney, Agent, or Firm* — Steven C. Bauman (57) ABSTRACT

The present invention relates to new cure accelerator systems for anaerobic curable compositions. These anaerobic cure accelerator systems include the combination of a cationic initiator and a reducing agent, plus either (a) an aromatic nitrogen-containing compound and a thiol or (b) acetyl phenyl hydrazine.

16 Claims, 6 Drawing Sheets

ANAEROBIC CURE SYSTEMS FOR ANAEROBIC CURABLE COMPOSITIONS, AND ANAEROBIC CURABLE COMPOSITIONS CONTAINING SAME

BACKGROUND OF THE INVENTION

1. Field of the Invention

The present invention relates to new cure accelerator systems for anaerobic curable compositions. These anaerobic cure systems include the combination of a cationic initiator and a reducing agent, plus either (a) an aromatic nitrogen-containing compound and a thiol or (b) acetyl phenyl hydrazine ("APH").

2. Brief Description of Related Technology

Anaerobic adhesive compositions generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Desirable anaerobic cure-inducing compositions to induce and accelerate cure may include saccharin, toluidines, such as N,N-diethyl-p-toluidine ("DE-p-T") and N,N-dimethyl-o-toluidine ("DM-o-T"), APH, maleic acid ("MA"), and quinones, such as napthaquinone and anthraquinone. See e.g. U.S. Pat. Nos. 3,218,305, 4,180,640, 4,287,330 and 4,321,349.

Saccharin and APH have been used as standard cure accelerator components in anaerobic adhesive cure systems since the inception of the technology, and have been well studied in that connection. Hitherto, it was believed that the nitrogen-hydrogen bond off the heterocycle ring was nessecary to achieve performance under anaerobic conditions, as early studies substituting the hydrogen with an alkyl group proved to be ineffective. See F. J. Boerio et al., "Surface-Enhanced Raman Scattering from Model Acrylic Adhesive Systems", *Langmuir*, 6, 721-27 (1990), in which it is stated "[t]hese salts [of saccharin] are thought to be important factors in the curing reaction of the adhesive."

Recently, Henkel Corporation was granted a series of U.S. patents that define anaerobic cure accelerator compounds. U.S. Pat. No. 6,835,762, which defines an invention directed to an anaerobic curable composition, comprises:

(a) a (meth)acrylate component;

(b) an anaerobic cure-inducing composition; and

(c) an anaerobic cure accelerator compound having the linkage —C(═O)—NH—NH— and an organic acid group on the same molecule. The composition is substantially free of acetyl phenyl hydrazine and maleic acid, and the anaerobic cure accelerator compound excludes 1-(2-carboxyacryloyl)-2-phenylhydrazine.

U.S. Pat. No. 6,897,277 is directed to and claims an anaerobic curable compositions, comprising:

(a) a (meth)acrylate component;

(b) an anaerobic cure-inducing composition substantially free of saccharin; and (c) an anaerobic cure accelerator compound within the following structure where R is selected hydrogen, halogen, alkyl, alkenyl, hydroxyalkyl, hydroxyalkenyl, carboxyl, or sulfonato, and $R^1$ is selected from of hydrogen, alkyl, alkenyl, hydroxyalkyl, hydroxyalkenyl, or aralkyl.

U.S. Pat. No. 6,958,368 is directed to and claims an anaerobic curable composition, comprising:

(a) a (meth)acrylate component;

(b) an anaerobic cure-inducing composition substantially free of saccharin; and (c) an anaerobic cure accelerator compound within the following structure where Y is an aromatic ring, optionally substituted at up to five positions by $C_{1-6}$ alkyl or alkoxy, or halo groups; A is C═O, S═O or O═S═O; X is NH, O or S and Z is an aromatic ring, optionally substituted at up to five positions by $C_{1-6}$ alkyl or alkoxy, or halo groups, or Y and Z taken together may join to taken together may join to the same aromatic ring or aromatic ring system, provided that when X is NH, o-benzoic sulfimide is excluded from that structure.

In J. V. Crivello et al., "Redox Cationic Polymerization: The Diaryliodonium Salt/Ascorbate Redox Couple", *J. Polym. Sci.*, 19, 539-48 (1981), the development and use of the diaryliodonium salt/ascorbate redox couple in the polymerization of several types of cationically polymerizable monomers is described. Chief among those monomers is epoxy.

U.S. Pat. No. 4,656,229 describes a two-part anaerobic adhesive that uses in the one part a diaryliodonium salt and in a second part the condensation reaction product of an aldehyde and a primary amine.

U.S. Pat. Nos. 4,413,108, 4,500,608, and 4,528,059 each speak to the use of triazine and thiols to facilitate anaerobic cure of adhesive compositions.

Notwithstanding the foregoing, there continues to be an on-going desire to find alternative technologies for accelerating the cure of anaerobic curable compositions, to differentiate existing products and provide supply assurances in the event of shortages or cessation of supply of raw materials. Accordingly, it would be desirable to identify new materials, which function as anaerobic cure systems for anaerobic curable compositions.

SUMMARY OF THE INVENTION

The present invention provides new anaerobic cure systems for anaerobic curable compositions, and anaerobic curable compositions including such anaerobic cure systems. The anaerobic curable compositions themselves are typically used as adhesives or sealants.

The anaerobic cure systems are broadly speaking the combination of a cationic initiator and a reducing agent, plus either (a) an aromatic nitrogen-containing compound and a thiol or (b) APH.

More specifically, the cationic initiator contains at least one positively charged atom associated with a soft anion, such as hexafluorophosphate and hexafluoroantimonate. The reducing agent may be an organic acid, such as a non-carboxylic organic acid, examples of which will be described in more detail below. The aromatic nitrogen-containing compound should contain at least one nitrogen atom as part of a ring structure, examples of which will be described in more detail below. The thiol should be a polythiol (i.e., having at least two thiol or mercaptan groups), examples of which will be described in more detail below.

The addition of these materials into anaerobic curable compositions as a replacement for some or all of the amount of conventional anaerobic cure components [such as peroxides, like cumene hydroperoxide ("CHP")] surprisingly provides at least comparable cure speeds and physical properties for the reaction products formed therefrom.

This invention also provides anaerobic curable compositions prepared with such anaerobic cure systems, methods of preparing and using the inventive anaerobic curable compositions as well as reaction products of the inventive anaerobic curable compositions.

The present invention will be more fully appreciated by a reading of the "Detailed Description of the Invention", and the illustrative examples which follow thereafter.

DETAILED DESCRIPTION OF THE INVENTION

The present invention provides an anaerobic cure system comprising the combination of a cationic initiator and a reducing agent, plus either (a) an aromatic nitrogen compound and a thiol or (b) APH. The addition of such a composition in anaerobic curable compositions as a replacement for some or all of the amount of conventional anaerobic cure components, surprisingly provides at least comparable cure speeds and physical properties for the reaction products formed.

Anaerobic curable compositions generally are based on a (meth)acrylate component, together with an anaerobic cure-inducing composition. Here, the anaerobic cure-inducing composition is the inventive anaerobic cure system described herein.

(Meth)acrylate monomers suitable for use as the (meth)acrylate component in the present invention may be chosen from a wide variety of materials, such as those represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999, the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

Two components are present in the inventive anaerobic cure system: cationic initiator and reducing agent. Cationic initiators are widely available commercially for many commercial applications. Examples are described herein.

Rhodia Chemie make available commercially a cationic photoinitiator for silicone-based release coatings, whose counter ion contains fluoride atoms covalently bound to aromatic carbon atoms of the counter ion, such as $B(C_6F_5)_4$. See International Patent Application Nos. PCT/FR97/00566 and PCT/FR98/00741. See also Rhone-Poulenc Chemie's U.S. Pat. Nos. 5,550,265, 5,668,192, 6,147,184, and 6,153,661.

However, Rhodia Chemie (or Rhone-Poulenc Chemie) has not taught, suggested or promoted such photoinitiators for use in anaerobic curable compositions.

As the cationic initiator, therefore, appropriate choices include those having a cation portion within structure I below:

where $R^1$, $R^2$, $R^3$, $R^4$, $R^5$ and $R^{5'}$ may or may not be present, but when not present are hydrogen and when any are present may individually be selected from $C_{1-6}$ alkyl, $C_{2-6}$ alkenyl, halogen, hydroxyl and carboxyl, with $R^1$, $R^2$, and $R^5$ being present individually up to 5 times on each aromatic ring to which it(they) is(are) attached, and $R^3$ and $R^4$ being present individually up to 4 times on each aromatic ring to which it(they) is(are) attached, n is 0-3 and m is 0-1.

More specific examples of cationic initiators having a cation portion within structure I include those represented by structures II and III:

II

III

In addition, appropriate cationic initiators include those having cation portions within structures IV, V, and VI:

IV

V

VI where for structures IV $R^6$, $R^7$, $R^8$, $R^9$ and $R^{10}$ may or may not be present, but when not present are hydrogen and when any are present may individually be selected from alkyl, such as from 1 to 5 carbon atoms, halogen, hydroxyl, and carboxyl, for structure V $R^6$, $R^7$, $R^8$, $R^9$, $R^{10}$, $R^{6'}$, $R^{7'}$, $R^{8'}$, $R^{9'}$, and $R^{10'}$ may or may not be present, but when not present are hydrogen and when any are present may individually be selected from hydrogen alkyl, such as from 1 to 5 carbon atoms, halogen, hydroxyl, and carboxyl, and for structure VI $R^{11}$, $R^{12}$, $R^{13}$, $R^{14}$, Rn, $R^{16}$, $R^{17}$, $R^{18}$, $R^{19}$, $R^{20}$, and $R^{21}$ may or may not be present, but when not present are hydrogen when any are present may individually be selected from hydrogen alkyl, such as from 1 to 5 carbon atoms, halogen, hydroxyl, and carboxyl.

More specific examples of cationic initiators having cationic portions within structure IV, V and VI include those represented by structures VII(a) and VII(b), VIII and IX, respectively:

VII(a)

VII(b)

VIII

IX

Structure VII(b) is the cationic portion of the photoinitiator called RHODOSIL 2074, commercially available from Rhodia Chemie, whose chemical name is tolylcumyl iodonium tetrakis(pentafluorophenyl)borate (CAS No. 178233-72-2).

Examples of other cationic photoinitiators include those commercially available from Sartomer, Exton, Pa. under the SARCAT® tradename, such as SARCAT® K185 [triarylsulfonium hexafluorophosphate (50% in propylene carbonate)]; SARCAT® SR1010 [triarylsulfonium hexafluoroantimonate (50% in propylene carbonate)]; and SARCAT® SR1012 (diaryliodonium hexafluoroantimonate or Iodonium, [4-[(2-hydroxytetradecyl)oxy]phenyl]-phenyl-, (OC-6-11)-hexafluoroantimonate(1-)). In addition, those available from Dow Chemical under the CYRACURE® tradename, such as UVI-

6976 (mixed triarylsulfonium hexafluoroantimonate salts); UVI-6992 (mixed triarylsulfonium hexafluorophosphate salts); DVI-6974 and UVI-6990 are also useful. Those cationic photoinitiators are useful as the cationic initiators of the present invention.

A particularly desirable cationic initiator is

Diaryliodonium hexafluorantimonate (DIAHFA)
CAS 139301-16-9 mw 516.81 which is an analogue of structures VII(a) or VII(b) associated with a hexafluoroantimonate cation. More specifically, R may be defined as shown below

[4-[(2-Hydroxytetradecyl)oxy]phenyl]phenyliodonium
hexafluoroantimonate CAS 139301-16-9

These cationic initiators are known as photoacid generators. Also, useful is

1-Butyl-3-methylimidazolium
hexafluroantimonate (BMIHFA)
CAS 174645-81-9

The reducing agent may be an organic acid, such as a vinylogous organic acid. Representative examples of the vinylogous organic acid include compounds containing one or more enol functional groups in conjugation with one or more carbonyl functional groups through one or more carbon-carbon or carbon-nitrogen double bonds. The vinylogous carboxylic acid compounds may be cyclic compounds. The vinlyogous carboxylic acid compounds may include tautomers, in particular keto-enol tautomers. The vinylogous carboxylic acid compounds may include compounds where the conjugation is obtained through one or more stabilized resonance forms of an aromatic compound. The vinylogous carboxylic acid compounds may alternatively be cationic compounds, which are positively charged. In one example, the cationic compound includes cationic ester derivatives of the vinylogous carboxylic acid compounds. In another example, the cationic compound includes cationic amide derivatives of the vinylogous carboxylic acid compounds. See G. V. Perez and Alice L. Perez, "Organic Acids Without A Carboxylic Acid Functional Group", J. Chem. Ed., 77, 7, 910-15 (2000).

The vinylogous carboxylic acid compounds ordinarily are conjugated. Conjugation may take two forms: conjugation may occur through one or more carbon-carbon or carbon-nitrogen double bonds, i.e., linear conjugation; or conjugation may occur through an aromatic system when one or more stabilized resonance structures of the aromatic compounds are vinylogous carboxylic acids. Linear and aromatic conjugation may also occur in compounds containing heteroatoms.

Representative examples of vinylogous carboxylic acid compounds include 3,4-dihydroxy 3-cyclobutene-1,2-dione (squaric acid); 2,5-dihydroxy 1,4-benzoquinone; 4,5-dihydroxy 4-cyclopentene 1,2,3-trione (croconic acid); 2-hydroxy 2,4,6-cycloheptatrienone (tropolone); 6-hydroxy-1-tetralone and 5,5 dimethyl-1,3-cyclohexanedione (dimedone). Other examples of compounds which fit the definition of the present invention further include: 5,6-dihydroxy-5-cyclohexene-1,2,3,4-tetraone (rhodizonic acid); 2 hydroxy 1,4 naptho-quinone; 3-oxogulofuranolactone; 2,2-dimethyl 1,3-dioxane; 4,6 dione 4-ketobutyrolactam; tetrahydrofuran 2,4-dione; 2,3 dihydroxy 2 cycloprofenegne (deltic acid) and uric acid.

Non-carboxylic organic acids, such as ascorbic acid, in either the D or L (Vitamin C) form, or a racemic mixture.

L-Ascorbic acid
CAS 50-81-7

L-Ascorbic acid 6-palmitate
CAS 137-66-6 are particularly desirable for use herein. In addition, the oxidized form—dehydroascorbic acid—is useful as well.

Dehydroascorbic acid

In addition to the cationic initiator and the reducing agent, either (a) an aromatic nitrogen-containing compound and a thiol or (b) APH may be added to the inventive anaerobic cure system.

The aromatic nitrogen-containing compound may be selected from a variety of compounds, the chemical structures of many of which are well documented. Particularly desirable aromatic nitrogen-containing compounds are triazines, an example of which is shown below.

2,4,6-tris(trichloromethyl)-
1,3,5-triazine
CAS 6542-67-2

One commercially available source of this triazine is Midori Kagaku Co. Ltd. under the tradename TAZ-101.

The thiol desirably is a polythiol. For instance, appropriate polythiols include any mercapto compound which has at least two thiol groups per molecule, such as trimethylopropane tris(β-mercaptopropionate), trimethylolpropane tris(thioglycolate), pentaerythritol tetrakis(thioglycolate), pentaerythritol tetrakis(β-mercaptopropionate), dipentaerythritol poly(β-mercaptopropionate), ethylene glycol bis(β-mercaptopropionate) and alkyl polythiols such as butane-1, 4-dithiol, hexane-1,6-dithiol, and aromatic polythiols such as p-xylenedithiol and 1,3,5-tris(mercaptomethyl)benzene. Polythiols may be added in amounts of about 25 to about 50% based on the total weight of the composition, such as about 33 to about 40%. A particularly desirable polythiol is Pentaerythritol tetrakis (3-mercaptopropionate)
CAS 7575-23-7

Additional traditional components may also be included in anaerobic curable compositions to alter the physical properties of either the curable compositions or the reaction products thereof.

For instance, one or more maleimide components, thermal resistance-conferring coreactants, diluent components reactive at elevated temperature conditions, mono- or poly-hydroxyalkanes, polymeric plasticizers, and chelators (see U.S. Pat. No. 6,043,327, the disclosure of which is hereby expressly incorporated herein by reference) may be included to modify the physical property and/or cure profile of the formulation and/or the strength or temperature resistance of the cured adhesive.

When used, the maleimide, coreactant, reactive diluent, plasticizer, and/or mono- or poly-hydroxyalkanes, may be present in an amount within the range of about 1 percent to about 30 percent by weight, based on the total weight of the composition.

The inventive compositions may also include other conventional components, such as free radical initiators, other free radical co-accelerators, inhibitors of free radical generation, as well as metal catalysts, such as iron and copper.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelators may ordinarily be present in the compositions in an amount from about 0.001 percent by weight to about 0.1 percent by weight, based on the total weight of the composition.

The anaerobic cure system may be used in amounts of about 0.5 to about 10 percent by weight, such as about 0.5 to about 5 percent by weight, desirably 1 to about 3 percent by weight, based on the total weight of the composition. When used in combination with conventional accelerators (though at lower levels, for such conventional accelerators), the inventive accelerators should be used in amounts of about 0.01 to about 5 percent by weight, such as about 0.02 to about 3 percent by weight.

Metal catalyst solutions or pre-mixes thereof are used in amounts of about 0.03 to about 0.1 percent by weight. Other agents such as thickeners, non-reactive plasticizers, fillers, toughening components (such as elastomers and rubbers), and other well-known additives may be incorporated therein where the art-skilled believes it would be desirable to do so.

The present invention also provides methods of preparing and using the inventive anaerobic cure systems and the anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, glass and other metals and alloys, ceramics and thermosets. The compositions of this invention demonstrate particularly good bond strength on steel, glass and aluminum. An appropriate primer may be applied to a surface of the chosen substrate to enhance cure rate. Or, the anaerobic cure system may be used as a primer itself. See e.g. U.S. Pat. No. 5,811,473.

The invention also provides a process for preparing a reaction product from the anaerobic adhesive composition of the present invention, the steps of which include applying the composition to a desired substrate surface and exposing the composition to an anaerobic environment for a time sufficient to cure the composition.

Of course, the present invention also provides for a bond formed between two mated substrates with the inventive composition.

In view of the above description of the present invention, it is clear that a wide range of practical opportunities is provided. The following examples are provided for illustrative purposes only, and are not to be construed so as to limit in any way the teaching herein.

EXAMPLES

An investigation was performed to evaluate these new anaerobic cure systems as compared with control formulations containing conventional anaerobic cure systems by timed adhesion tests on nut/bolt specimens constructed from stainless steel and steel.

A. Adhesive Formulations

Samples A-Q were prepared from the noted components in the listed amounts in Tables 1-4, by mixing with a mechanical stirrer in plastic bottles. Samples A and B are set forth as controls, with Sample A containing a conventional anaerobic cure system and Sample B containing no anaerobic cure system.

In Table 1, Samples C-D include the combination of DAIHFA and AA as an anaerobic cure system, whereas Samples E-F include APH as well. A list of the acronyms for the listed components is provided for convenience below Table 1.

Each of the samples was later evaluated for performance with active and passive substrates (i.e., steel and stainless steel, respectively) to determine the effectiveness of the DAIHFA/AA cure system compared with a conventional anaerobic cure system and with and without APH. The observed results are recorded in Tables 5 and 6 and FIGS. 1-2, respectively.

TABLE 1

| Components | | Sample/(Amount/wt. %) | | | | | |
|---|---|---|---|---|---|---|---|
| Type | Identity | A | B | C | D | E | F |
| (Meth)acrylate | PEGMA | 64.88 | 64.88 | 64.88 | 64.88 | 64.88 | 64.88 |
| Plasticizer/Diluent | PEG Monooleate | 28.65 | 35.03 | 34.03 | 33.03 | 33.53 | 32.53 |
| Stabilizer | NQ/EDTA | 0.09 | 0.09 | 0.09 | 0.09 | 0.09 | 0.09 |
| Conventional Anaerobic Cure System | DE-p-T | 0.8 | 0 | 0 | 0 | 0 | 0 |
| | BS | 3.78 | 0 | 0 | 0 | 0 | 0 |
| | CHP | 1.8 | 0 | 0 | 0 | 0 | 0 |
| Cationic Initiator | DAIHFA | 0 | 0 | 0.5 | 1.0 | 0.5 | 1.0 |
| Organic Acid | AA | 0 | 0 | 0.5 | 1.0 | 0.5 | 1.0 |
| Reducing Agent | APH | 0 | 0 | 0 | 0 | 0.5 | 0.5 |

| Identity | Description |
|---|---|
| PEGMA | Polyethylene glycol dimethacrylate |
| PEG Monooleate | Polyethylene glycol monooleate |
| NQ | 1,4-Napthoquinone |
| EDTA | Ethylenediaminetetraacetic acid |
| DE-p-T | Diethyl-para-toluidine |
| BS | 1,1-Dioxo-1,2-benzothiazol-3-one |
| CHP | Cumene hydroperoxide |
| DAIHFA | Iodonium,[4-[(2-hydroxytetradecyl)oxy]phenyl]-phenyl-,(OC-6-11)-hexafluoroantimonate(1-) |
| AA | (R)-3,4-dihydroxy-5-((S)-1,2-dihydroxyethyl)furan-2(5H)-one |
| APH | 1-Acetyl-2-phenylhydrazide |
| Triazine | 2,4,6-tris(trichloromethyl)-1,3,5-triazine |
| PETMP | Pentaerythritol tetrakis (3-mercaptopropionate |
| BMIHFA | 1-Butyl-3-methylimidazolium hexafluroantimonate |

Samples A and B are as listed above in Table 1 and Samples G-J were prepared from the noted components in the listed amounts in Table 2, by mixing with a mechanical stirrer in plastic bottles.

Samples G-H include the combination of Triazine and PETMP as an anaerobic cure system, whereas Samples I-J include DAIHFA and AA as well.

These samples were later evaluated for performance with active and passive substrates to determine the effectiveness of the Triazine/PETMP cure system, with and without the DAIHFA/AA cure system.

TABLE 2

| Components | | Sample/(Amount/wt. %) | | | | | |
|---|---|---|---|---|---|---|---|
| Type | Identity | A | B | G | H | I | J* |
| (Meth)acrylate | PEGMA | 64.88 | 64.88 | 64.88 | 64.88 | 64.88 | 64.88 |
| Plasticizer/Diluent | PEG Monooleate | 28.65 | 35.03 | 34.33 | 34.68 | 33.33 | 33.68 |
| Stabilizer | NQ/EDTA | 0.09 | 0.09 | 0.09 | 0.09 | 0.09 | 0.09 |
| Conventional Anaerobic Cure System | DE-p-T | 0.8 | 0 | 0 | 0 | 0 | 0 |
| | BS | 3.78 | 0 | 0 | 0 | 0 | 0 |
| | CHP | 1.8 | 0 | 0 | 0 | 0 | 0 |
| Oxidant | Triazine | 0 | 0 | 0.5 | 0.25 | 0.5 | 0.25 |
| Reducing Agent | PETMP | 0 | 0 | 0.2 | 0.1 | 0.2 | 0.1 |
| Cationic Initiator | DAIHFA | 0 | 0 | 0 | 0 | 0.5 | 0.5 |
| Organic Acid | AA | 0 | 0 | 0 | 0 | 0.5 | 0.5 |

*Sample J was not stable.

Samples K-M were prepared from the noted components in the listed amounts in Table 3, by mixing with a mechanical stirrer in plastic bottles.

Sample K is a control, as it includes a conventional anaerobic cure system. Sample L includes the combination of DAIHFA and AA as an anaerobic cure system, whereas Sample M includes APH as well.

These samples were later evaluated for performance with active and passive substrates to determine the effectiveness of the DAIHFA/AA cure system with and without APH.

TABLE 3

| Components | | Sample/(Amount/wt. %) | | |
|---|---|---|---|---|
| Type | Identity | K | L | M |
| (Meth)acrylate | PEGMA | 64.88 | 64.88 | 64.88 |
| Plasticizer/Diluent | PEG Monooleate | 28.65 | 33.03 | 32.88 |
| Stabilizer | NQ/EDTA | 0.09 | 0.09 | 0.09 |
| Conventional Anaerobic Cure System | DE-p-T | 0.8 | 0 | 0 |
| | BS | 3.78 | 0 | 0 |
| | CHP | 1.8 | 0 | 0 |
| Cationic Initiator | DAIHFA | 0 | 1 | 1 |
| Organic acid | AA | 0 | 1 | 1 |
| Reducing Agent | APH | 0 | 0 | 0.15 |

Samples A and B are as listed above in Table 1 and Samples N-Q were prepared from the noted components in the listed amounts in Table 4, by mixing with a mechanical stirrer in plastic bottles.

Samples N-O include the combination of BMIHFA and AA as an anaerobic cure system, whereas Samples P-Q include the combination of BMIHFA and AAP.

These samples were later evaluated for performance with active and passive substrates to determine the effectiveness of the BMIHFA/AA and BMIHFA/AAP cure systems.

TABLE 4

| Components | | Sample/(Amount/wt. %) | | | | | |
|---|---|---|---|---|---|---|---|
| Type | Identity | A | B | N | O | P | Q |
| (Meth)acrylate | PEGMA | 64.88 | 64.88 | 64.88 | 64.88 | 64.88 | 64.88 |
| Plasticizer/Diluent | PEG Monooleate | 28.65 | 35.03 | 34.03 | 33.03 | 34.03 | 33.03 |
| Stabilizer | NQ/EDTA | 0.09 | 0.09 | 0.09 | 0.09 | 0.09 | 0.09 |
| Conventional Anaerobic | DE-p-T | 0.8 | 0 | 0 | 0 | 0 | 0 |
| | BS | 3.78 | 0 | 0 | 0 | 0 | 0 |

TABLE 4-continued

| Components | | Sample/(Amount/wt. %) | | | | | |
|---|---|---|---|---|---|---|---|
| Type | Identity | A | B | N | O | P | Q |
| Cure System | CHP | 1.8 | 0 | 0 | 0 | 0 | 0 |
| Cationic Initiator | BMIHFA | 0 | 0 | 0.5 | 1.0 | 0.5 | 1.0 |
| Organic Acid | AA | 0 | 0 | 0.5 | 1.0 | 0 | 0 |
| | AAP | 0 | 0 | 0 | 0 | 0.5 | 1.0 |

B. Physical Properties

Breakaway/Breakloose and Prevail Strengths

For the adhesion tests, the specimens were maintained at ambient temperature for a number of time intervals, and evaluated for performance. The time intervals were either: 1 hour and 24 hours (Tables 5-7 and FIG. 1-4) or 30 minutes, 60 minutes, 120 minutes, 240 minutes, 1440 minutes and 7200 minutes (Table 8 and FIGS. 5-6). The break and prevail torque strengths were observed and recorded for the specimens at ambient temperature for these time intervals. The torque strengths were measured on a calibrated automatic torque analyzer.

The data for these evaluations is provided herein in Tables 5-8 and illustrated in FIGS. 1-6. Each sample was evaluated in triplicate at the time interval noted. In addition to prevail strength breakaway strength is reported in Tables 5-7, whereas breakloose strength is reported in Table 8.

TABLE 5

| | | 1 hour | | 24 hour | |
|---|---|---|---|---|---|
| ID | | 60 Breakaway | 180 Prevail | 1440 Breakaway | 180 Prevail |
| A | +/− | 73 | 16 | 151 | 37 |
| | | 24 | 5 | 13 | 7 |
| B | +/− | 0 | 0 | 0 | 0 |
| | | 0 | 0 | 0 | 0 |
| C | +/− | 19 | 2 | 21 | 3 |
| | | 11 | 2 | 19 | 4 |
| D | +/− | 61 | 13 | 92 | 24 |
| | | 12 | 9 | 26 | 11 |
| E | +/− | 49 | 9 | 78 | 19 |
| | | 10 | 3 | 15 | 9 |
| F | +/− | 77 | 18 | 94 | 21 |
| | | 11 | 5 | 5 | 7 |
| G | +/− | 41 | 9 | 111 | 29 |
| | | 3 | 3 | 7 | 8 |
| H | +/− | 42 | 11 | 87 | 19 |
| | | 4 | 3 | 10 | 6 |
| I | +/− | 83 | 103 | 103 | 30 |
| | | 6 | 14 | 14 | 6 |
| J | +/− | NT | NT | NT | NT |

NT: Not Tested

Figure 1:
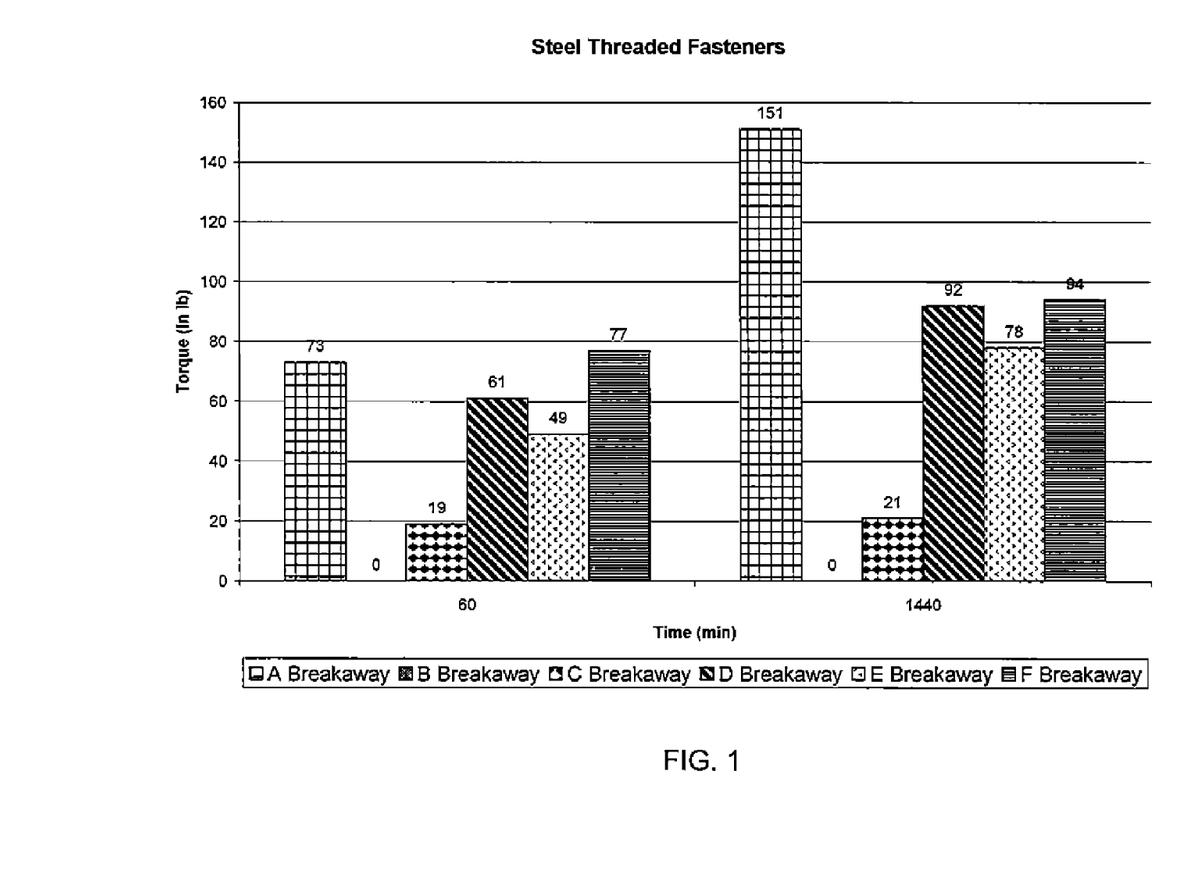
FIG. 1 depicts a bar chart of breakaway torque versus fixture time on threaded steel fasteners for anaerobic curable compositions.
Figure 3:
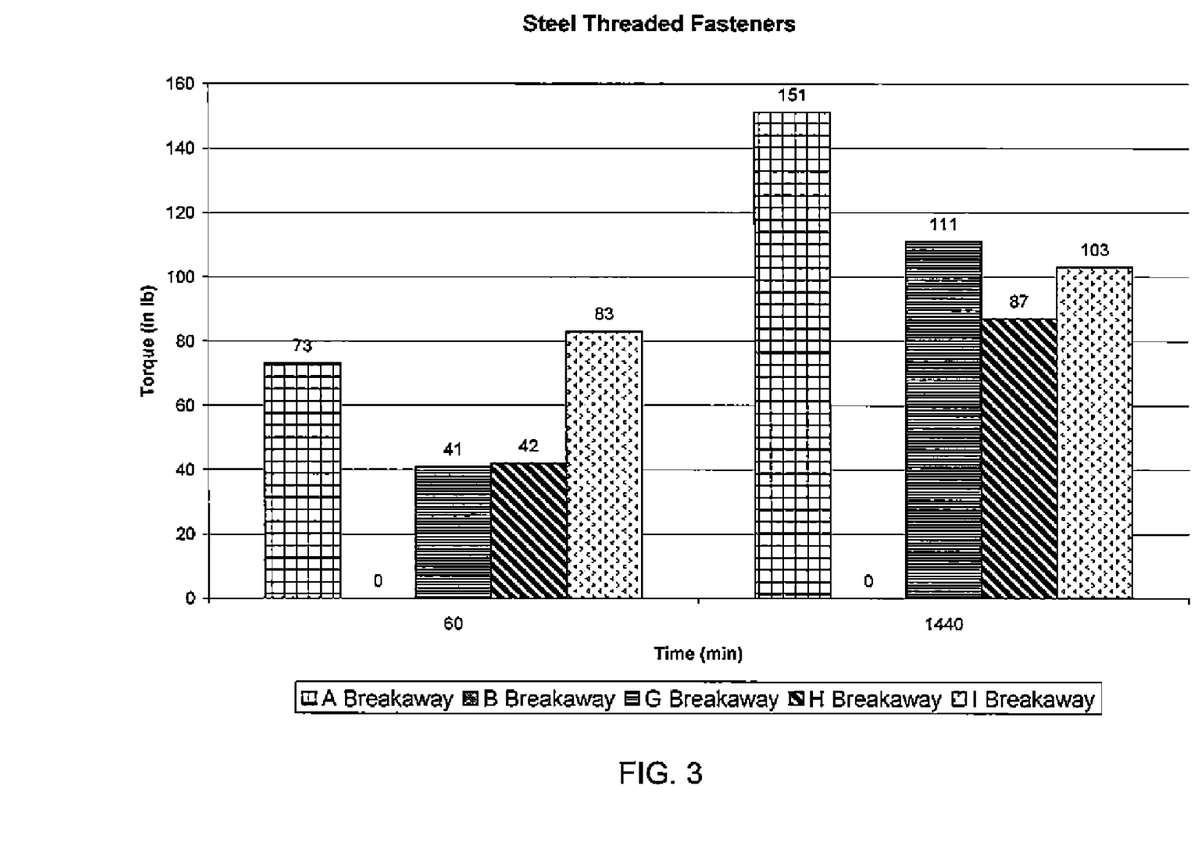
FIG. 3 depicts a bar chart of breakaway torque versus fixture time on threaded steel fasteners for anaerobic curable compositions.

The data set forth in Table 5 is shown in FIGS. 1 and 3.

TABLE 6

| | | 1 hour | | 24 hour | |
|---|---|---|---|---|---|
| ID | | 60 Breakaway | 180 Prevail | 1440 Breakaway | 180 Prevail |
| A | +/− | 0 | 0 | 26 | 17 |
| | | 0 | 0 | 7 | 4 |
| B | +/− | 0 | 0 | 0 | 0 |
| C | +/− | 0 | 0 | 24 | 5 |
| | | 0 | 0 | 18 | 3 |
| D | +/− | 0 | 0 | 43 | 10 |
| | | 0 | 0 | 12 | 4 |
| E | +/− | 0 | 0 | 41 | 9 |
| | | 0 | 0 | 11 | 4 |
| F | +/− | 0 | 0 | 69 | 14 |
| | | 0 | 0 | 9 | 3 |
| G | +/− | 27 | 2 | 60 | 9 |
| | | 3 | 1 | 14 | 10 |
| H | +/− | 6 | 4 | 48 | 15 |
| | | 0 | 1 | 10 | 9 |
| I | +/− | 14 | 5 | 27 | 7 |
| | | 5 | 4 | 4 | 6 |
| J | +/− | NT | NT | NT | NT |

NT: Not Tested

Figure 2:
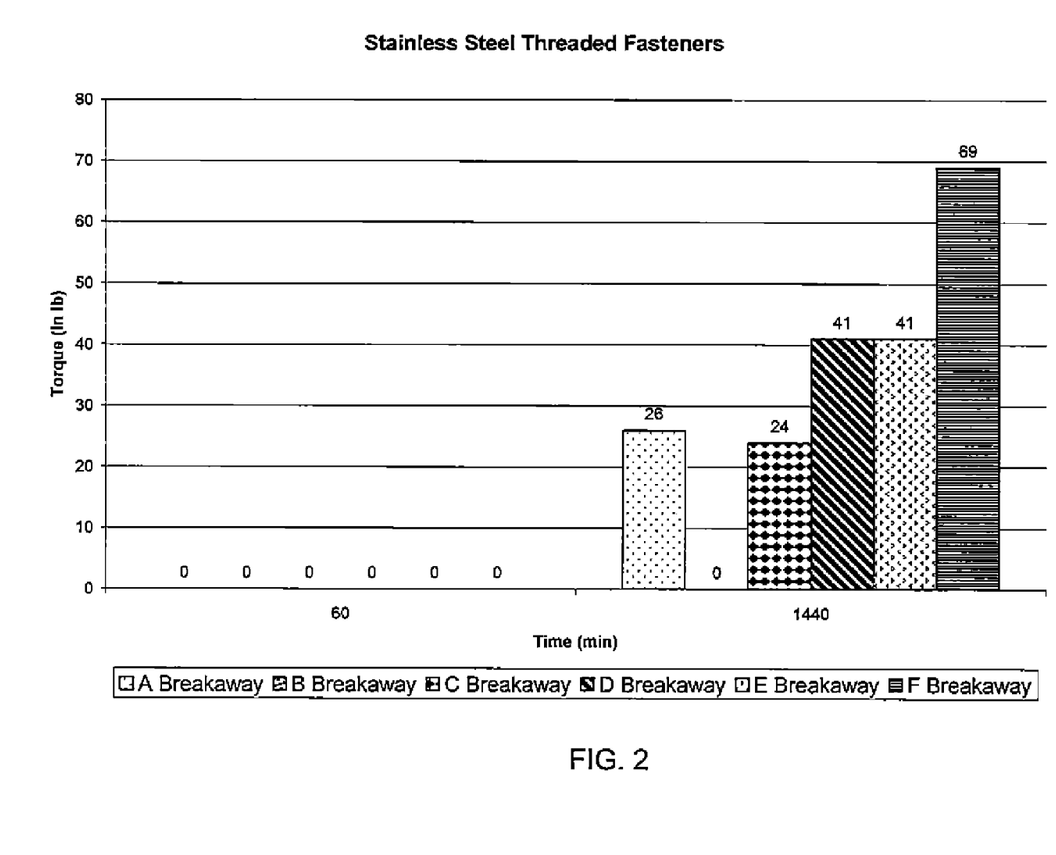
FIG. 2 depicts a bar chart of breakaway torque versus fixture time on threaded stainless steel fasteners for anaerobic curable compositions.
Figure 4:
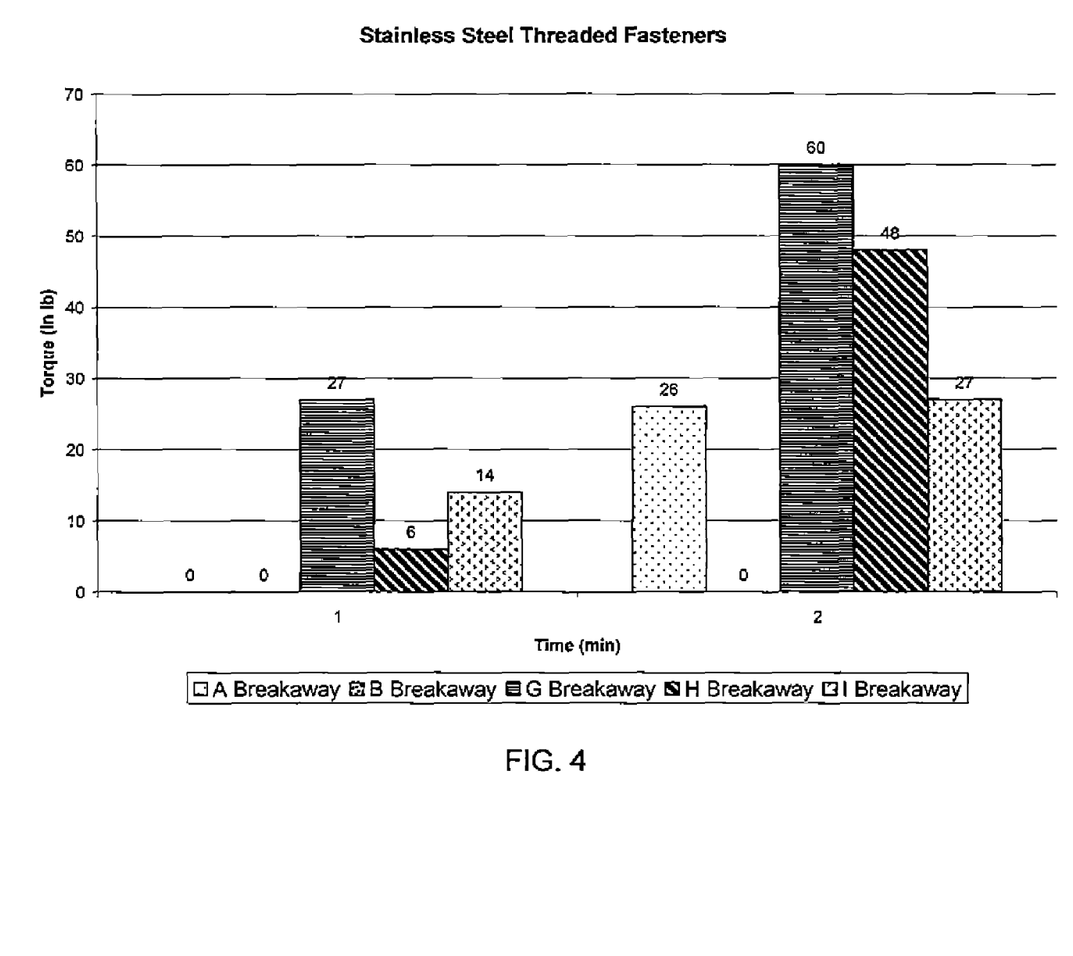
FIG. 4 depicts a bar chart of breakaway torque versus fixture time on threaded stainless steel fasteners for anaerobic curable compositions.

The data set forth in Table 6 is shown in FIGS. 2 and 4.

TABLE 7

| | | 1 hour | | 24 hour | |
|---|---|---|---|---|---|
| ID | | 60 Breakaway | 180 Prevail | 1440 Breakaway | 180 Prevail |
| A | +/− | 73 | 16 | 151 | 34 |
| | | 24 | 5 | 13 | 7 |
| B | +/− | 0 | 0 | 0 | 0 |
| | | 0 | 0 | 0 | 0 |
| N | +/− | 6 | 6 | 43 | 9 |
| | | 1 | 0 | 6 | 3 |
| O | +/− | 5 | 5 | 94 | 28 |
| | | 2 | 1 | 5 | 8 |
| P | +/− | 6 | 6 | 83 | 19 |
| | | 1 | 1 | 6 | 6 |
| Q | +/− | 0 | 0 | 82 | 20 |
| | | 0 | 0 | 11 | 4 |

Figure 6:
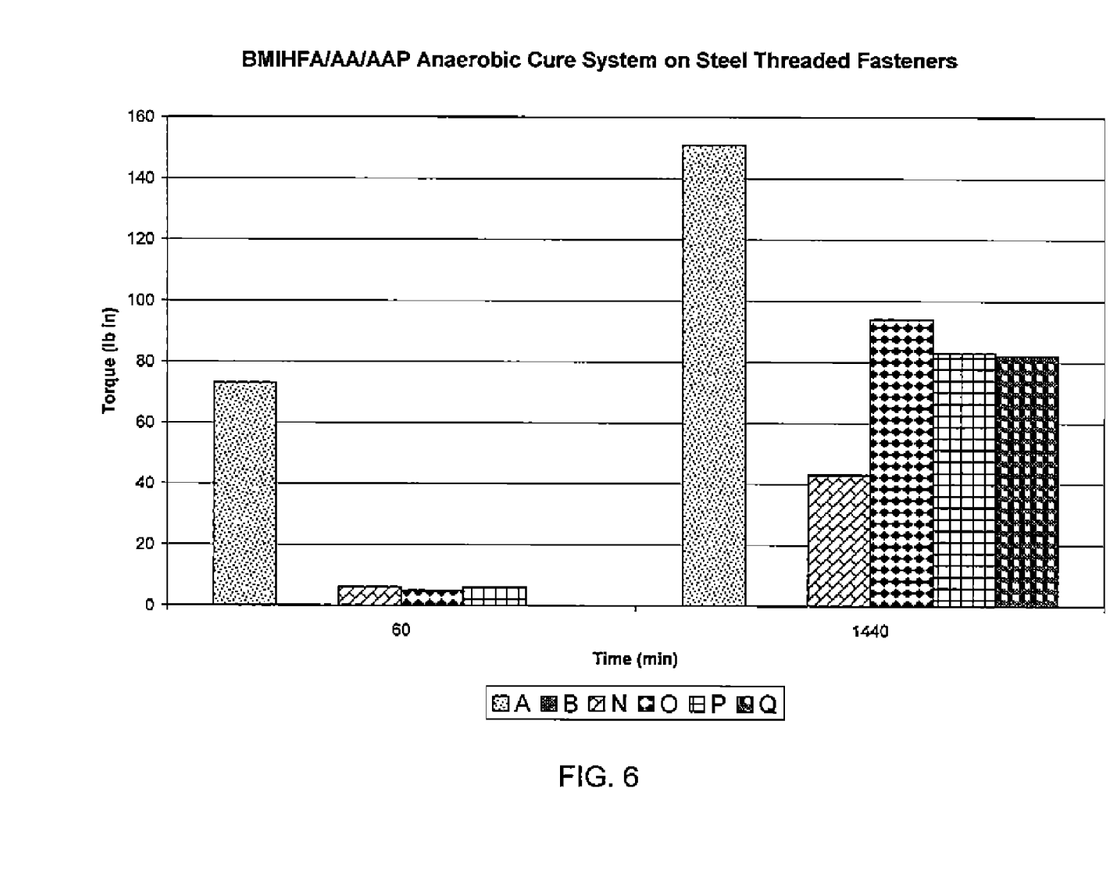
FIG. 6 depicts a bar chart of breakloose torque versus fixture time on threaded steel fasteners for anaerobic curable compositions.

The data set forth in Table 7 is shown in FIG. 6.

TABLE 8

| | | 30 minutes | | 1 hour | | 2 hour | | 4 hour | | 24 hour | | 6 days | |
|---|---|---|---|---|---|---|---|---|---|---|---|---|---|
| ID | | 30 Breakloose | 180 Prevail | 60 Breakloose | 180 Prevail | 120 Breakloose | 180 Prevail | 240 Breakloose | 180 Prevail | 1440 Breakloose | 180 Prevail | 7200 Breakloose | 180 Prevail |
| K | +/− | 106 | 2 | 124 | 8 | 167 | 16 | 172 | 20 | 190 | 24 | 177 | 26 |
| | | 10 | 2 | 17 | 4 | 8 | 2 | 20 | 3 | 30 | 8 | 18 | 4 |
| L | +/− | 94 | 2 | 118 | 6 | 128 | 8 | 136 | 18 | 181 | 29 | 187 | 23 |
| | | 10 | 1 | 12 | 3 | 13 | 5 | 9 | 8 | 18 | 9 | 9 | 7 |

TABLE 8-continued

| | 30 minutes | | 1 hour | | 2 hour | | 4 hour | | 24 hour | | 6 days | |
|---|---|---|---|---|---|---|---|---|---|---|---|---|
| ID | 30 Breakloose | 180 Prevail | 60 Breakloose | 180 Prevail | 120 Breakloose | 180 Prevail | 240 Breakloose | 180 Prevail | 1440 Breakloose | 180 Prevail | 7200 Breakloose | 180 Prevail |
| M +/− | 106 | 2 | 118 | 8 | 110 | 7 | 126 | 17 | 160 | 27 | 188 | 19 |
| | 10 | 3 | 15 | 3 | 13 | 2 | 11 | 10 | 18 | 13 | 10 | 4 |

Figure 5:
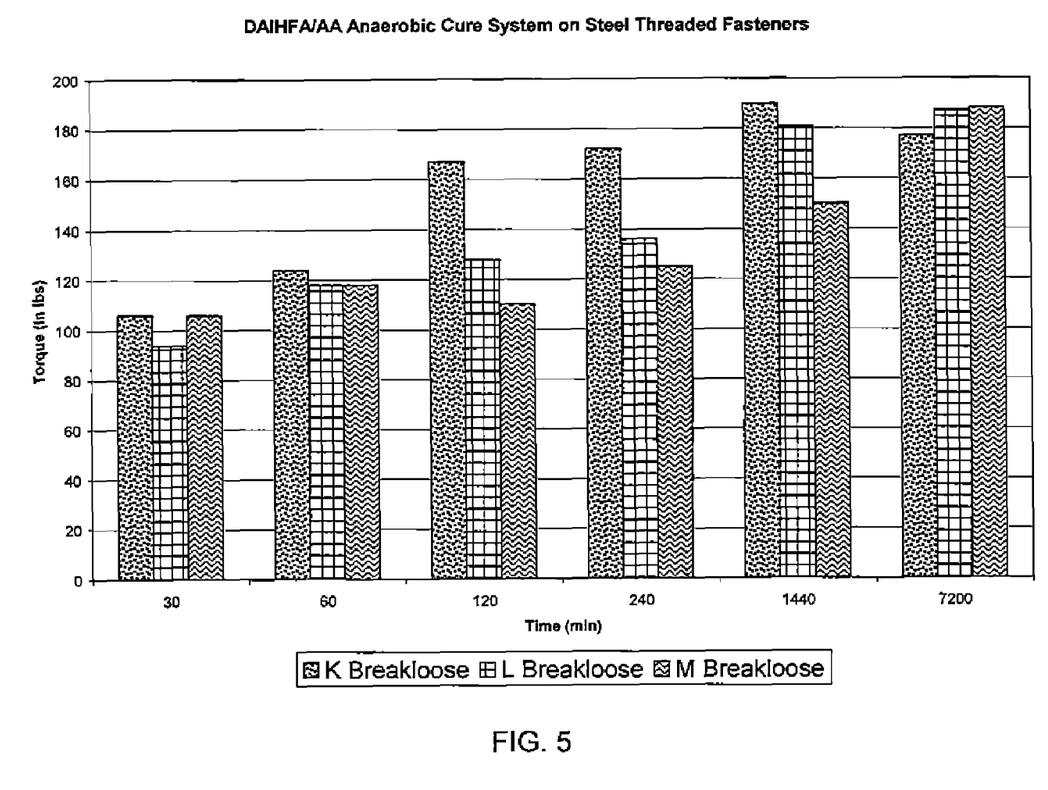
FIG. 5 depicts a bar chart of breakloose torque versus fixture time on threaded steel fasteners for anaerobic curable compositions.

The data set forth in Table 8 is shown in FIG. 5.

An examination of the data presented shows that the inventive anaerobic cure systems indeed show an effect, with that effect improving over time and in some instances being improved over the control. The effect on some systems was even observed on the inactive substrates and indeed in some cases was observed to be improved over the controls.

What is claimed is:

1. An anaerobic curable composition, comprising:
    (a) a (meth)acrylate component; and
    (b) an anaerobic cure-inducing composition comprising the combination of a cationic initiator and at least one reducing agent, and either (a) an aromatic nitrogen-containing compound and a thiol or (b) acetyl phenyl hydrazine.

2. The composition according to claim 1, wherein the anaerobic cure-inducing composition comprises an aromatic nitrogen-containing compound and a thiol.

3. The composition according to claim 1, wherein the anaerobic cure-inducing composition comprises acetyl phenyl hydrazine.

4. The composition according to claim 1, wherein the reducing agent is an organic acid.

5. The composition according to claim 1, wherein the reducing agent is acetyl phenyl hydrazine.

6. The composition according to claim 1, wherein the (meth)acrylate component is represented by $H_2C=CGCO_2R^1$, wherein G is a member selected from the group consisting of H, halogen and alkenyl having from 1 to about four carbon atoms, and $R^1$ is a member selected from the group consisting of alkyl, cycloalkyl, alkenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

7. The composition according to claim 1, wherein the (meth)acrylate component is a member selected from the group consisting of silicone(meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran(meth)acrylates and di(meth)acrylates, hydroxypropyl(meth)acrylate, hexanediol di(meth)acrylate, and trimethylol propane tri(meth)acrylate.

8. The composition according to claim 2, wherein the aromatic nitrogen-containing compound is a triazine.

9. The composition according to claim 3, wherein the thiol is a member selected from the group consisting of trimethylolpropane tris(β-mercaptopropionate), trimethylolpropane tris(thioglycolate), pentaerythritol tetrakis (thioglycolate), pentaerythritol tetrakis(β-mercaptopropionate), dipentaerythritol poly(β-mercaptopropionate), ethylene glycol bis (β-mercaptopropionate), butane-1,4-dithiol, hexane-1,6-dithiol, p-xylenedithiol and 1,3,5-tris(mercaptomethyl) benzene.

10. A reaction product of the composition according to claim 1.

11. A process for preparing the reaction product from an anaerobic curable composition according to claim 1, comprising the steps of:
    applying the anaerobic curable composition to a desired substrate surface and
    exposing the composition to an anaerobic environment to cure the composition.

12. A method of preparing an anaerobic curable composition according to claim 1, comprising the step of:
    mixing together:
    a (meth)acrylate component, and
    an anaerobic cure-inducing composition comprising the combination of a cationic initiator and an organic acid, optionally plus either (a) an aromatic nitrogen compound and a thiol or (b) acetyl phenyl hydrazine.

13. The composition according to claim 1, wherein the anaerobic cure-inducing composition comprises the combination of a free radical initiator and a free radical co-accelerator.

14. A method of using an anaerobic cure inducing composition in according to claim 1, comprising either:
    (I) mixing the anaerobic cure-inducing composition into the anaerobic curable composition; or
    (II) applying onto a surface of a substrate the anaerobic cure-inducing composition and applying thereover the anaerobic curable composition.

15. An anaerobic cure-inducing composition, comprising the combination of a cationic initiator and an organic acid, optionally plus at least one reducing agent, and either (a) an aromatic nitrogen compound and a thiol or (b) acetyl phenyl hydrazine.

16. An adhesive bond formed between two mated substrates with the composition of claim 1.

* * * * *